(12) United States Patent
Godoy et al.

(10) Patent No.: US 7,208,943 B2
(45) Date of Patent: Apr. 24, 2007

(54) ELECTRICAL DEVICE ENCLOSURE

(75) Inventors: Arquimedes Godoy, Chihuahua (MX);
Daniel A. Martinez, El Paso, TX (US);
Juan C. Lozano, Chihuahua (MX);
Jose L Almaraz, Chihuahua (MX);
Ruben Garcia, Jr., El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 127 days.

(21) Appl. No.: 11/145,406

(22) Filed: Jun. 3, 2005

(65) Prior Publication Data
US 2006/0274485 A1 Dec. 7, 2006

(51) Int. Cl.
*G01B 7/30* (2006.01)

(52) U.S. Cl. ............... 324/207.25; 324/207.2; 324/207.21; 324/262; 174/521; 174/522; 264/272.11

(58) Field of Classification Search ......... 174/521–522
See application file for complete search history.

(56) References Cited

U.S. PATENT DOCUMENTS

| | | | | |
|---|---|---|---|---|
| 3,584,106 A * | 6/1971 | Miller | ........................ | 264/262 |
| 4,077,861 A * | 3/1978 | Lauer | ........................ | 204/402 |
| 4,349,735 A | 9/1982 | Maeda | ........................ | 260/229 |
| 4,570,118 A | 2/1986 | Tomczak et al. | | |
| 4,619,624 A * | 10/1986 | Kerr et al. | ..................... | 445/22 |
| 4,642,496 A | 2/1987 | Kerviel et al. | ............ | 310/68 B |
| 4,838,563 A | 6/1989 | Konishi et al. | ............. | 280/840 |
| 5,709,558 A * | 1/1998 | Dreyer et al. | ................. | 439/95 |
| 5,712,428 A * | 1/1998 | Schleiferbock | .............. | 73/708 |
| 6,051,783 A * | 4/2000 | Dreyer et al. | ............... | 174/522 |
| 6,232,771 B1 | 5/2001 | Herden et al. | ......... | 324/207.25 |
| 6,486,764 B2 | 11/2002 | Byram | ....................... | 336/110 |
| 6,489,761 B1 | 12/2002 | Schroeder et al. | ..... | 324/207.25 |
| 6,566,864 B1 | 5/2003 | Brown et al. | ............ | 324/207.2 |
| 6,597,168 B1 | 7/2003 | Lee | | |
| 6,720,763 B1 | 4/2004 | Nehl et al. | ............. | 324/207.25 |
| 6,732,438 B2 | 5/2004 | Enzinna | ...................... | 33/1 PT |

(Continued)

FOREIGN PATENT DOCUMENTS

EP       0 575 971       12/1993

(Continued)

OTHER PUBLICATIONS

European Search Report dated Sep. 18, 2006.

*Primary Examiner*—Jay M. Patidar
(74) *Attorney, Agent, or Firm*—Paul L. Marshall

(57) ABSTRACT

A robust, low cost, compact and highly accurate rotary position sensor is disclosed for measuring the relative angular position (within a range ≦180°) of a housing or stator and a rotor. The housing carries a galvanomagnetic sensing element and is adapted for fixation to a relatively fixed portion of a host system. The rotor carrying a magnet is disposed for rotation about a fixed axis with respect to the stator and is interconnected to a relatively moving portion of the host system through intermediate linkage. The magnet is juxtaposed in substantially axial alignment with the galvanomagnetic sensing element for magnetic interaction therewith. The housing defines a cavity to receive potting material for encasing the galvanomagnetic sensing element and an adjacent buffer cavity interconnected by a weir, which diverts ant excess potting material into the buffer cavity.

10 Claims, 7 Drawing Sheets

U.S. PATENT DOCUMENTS

| | | | |
|---|---|---|---|
| 6,777,928 B2 | 8/2004 | Ramirez | 324/207.25 |
| 6,850,059 B2 | 2/2005 | Barron et al. | 324/262 |
| 2004/0139619 A1 | 7/2004 | Tateishi et al. | |
| 2004/0174159 A1 | 9/2004 | Ramirez | |

FOREIGN PATENT DOCUMENTS

| | | |
|---|---|---|
| EP | 1083406 A2 | 3/2001 |
| EP | 0907068 B1 | 5/2004 |

\* cited by examiner

ELECTRICAL DEVICE ENCLOSURE

TECHNICAL FIELD

The present invention relates generally to position sensors, and, more particularly, to non-contact sensors for measuring the relative angular position between relatively rotatable objects, and, more particularly still, to compact, highly accurate, low cost sensors, which are readily adaptable to varied applications, particularly high volume automotive applications.

RELATED PATENT APPLICATION

This application relates to a corresponding application Ser. No. 11/144,081 entitled "Rotary Position Sensor" filed on even date herewith, and owned by a common assignee of interest.

BACKGROUND OF THE INVENTION

Angular and linear position sensors are widely used in automatic control systems as feedback-sensing devices in one or more control loops of the system. Rotary position sensors are adaptable for many applications. For example, in the automotive industry, rotary position sensors are applied for monitoring or providing active control of many vehicle born systems such as active suspension, body height position sensing, steering wheel and throttle position sensing, throttle control, seat and window positioning systems, door and body panel closure systems and accessory actuation systems, to name a few.

Rotary position sensors frequently employ a magnetic field and a galvanomagnetic sensing element, such as a Hall effect device or a magneto resistor located within the magnetic field. To detect rotational movement as between a first article (such as for example a rotatable throttle shaft of an air control valve) and a second article (such as for example a stationary base), the magnetic field is oriented transverse in relation to the axis of rotation of the first article, and the galvanomagnetic sensing element is located inside the magnetic field. The member providing the magnetic field is connected to one of the articles, and the galvanomagnetic sensing element is connected to the other article. As the articles rotate relative to each other, the galvanomagnetic sensing element is caused to change its angular position relative to the magnetic field direction, resulting in a change of output signal from the galvanomagnetic sensing element responsive to its angle with respect to the magnetic field direction. This change in signal is indicative of the angular position as between the first and second articles.

As described in U.S. Pat. No. 6,489,761, position sensors with digital outputs provide discrete position information only. Position sensors (Philips KMA200, Micronas HAL855, etc.) having digital outputs, such as Pulse Width Modulated-PWM or Serial Protocol Interface-SPI, can also be used for providing continuous position information. This position information can then be used to drive electromechanical devices. Non-contact, magnetic switches provide discrete position information only. Non-contact, magnetic sensors (of the kind "switching halls" or "switching MRs"), typically used for engine cam/crank and/or ABS applications, also provide quasi-digital outputs where a high indicates a tooth (or slot) and a low indicates a slot (or tooth) on the ferromagnetic target wheel being sensed. Alternatively, the sensor of the present invention provides continuous position information in either digital or analog (ratio-metric) mode, depending on the application.

A typical prior art analog position sensor can provide both position information and outputs that can be used to drive an electric motor or similar electromechanical devices. Many of these devices are driven by sinusoidal excitations as a function of position. Consequently, an analog position sensor having an output that varies sinusoidally with position could be used to generate absolute angular positions as, for example, an electrical power steering system to measure the angle of rotation of the steering wheel, and/or reference signals to produce the desired sinusoidal phase drive currents and voltages to drive electric motors and other similar electromechanical devices.

The operational principle of an angle encoder sensor is based upon the property of Hall plates or semiconductor magneto resistors, collectively referred to herein as magnetosensitive devices, to sense only the normal component of the magnetic field passing through them, in the case of the hall devices, or the parallel component, in the case of the magneto resistive devices. The operation of Hall plates will be described below, keeping in mind that magneto resistors operate in a similar manner but are sensitive to direction changes of the incident magnetic field parallel to the face of such devices. Consequently, if a constant and uniform magnetic field is rotated in a plane perpendicular to the surface of a magnetosensitive device, the output signal will vary as the cosine of the angle between the direction of the incident magnetic field lines and the line normal to the surface of the device. It is preferred in this regard, that the magnetosensitive device be linear in its response to change in direction of the incident magnetic field, such as that provided by Hall plates. However, magneto resistors operating in their linear region (ie. under saturation) can also be used. In addition, operation over any ambient temperature range may require temperature compensated magnetosensitive devices. Also, it should be noted that included by the term "magnetosensitive devices" are ferromagnetic magneto resistors, including giant magneto resistor (GMR) sensors.

Accordingly, what remains needed is a compact, robust, highly accurate and inexpensive rotary position sensor, which is easily adaptable for varied applications and can be easily manufactured in large quantities while maintaining quality and consistency of performance.

BRIEF DESCRIPTION OF THE INVENTION

Generally, the present invention fulfills the forgoing needs by providing, in one aspect thereof, a sensor assembly for measuring angular position. The sensor comprises a housing assembly including a galvanomagnetic sensing element such as a Hall effect sensing element, a magnetoresistive sensing element or the like, and a rotor assembly which is carried by the housing assembly for relative rotation with respect thereto about a fixed axis. The rotor assembly carries a permanent or electromagnet, which is axially aligned with the galvanomagnetic sensing element for magnetic interaction therewith. The galvanomagnetic sensing element produces an output signal indicative of the relative angular position of the housing assembly and rotor assembly.

The present invention provides a robust, low cost rotary position sensor. The rotary position sensor can be easily produced in large numbers by relatively low cost tools. The sensor design contains numerous features, which ensure consistent, reproducible assembly, and therefore, high quality, without a large capital investment.

According to the preferred embodiment of the invention, the rotary position sensor includes a housing assembly, which is flexibly adaptable for fixation to a relatively fixed portion of a host system such as the body of a motor vehicle. A galvanomagnetic sensing element is carried with the housing assembly. A rotor assembly is arranged for rotation about an axis, which has a fixed orientation with respect to the housing assembly. The rotor assembly carries a magnet, which is axially juxtaposed with the galvanomagnetic sensing element for magnetic interaction therewith. The sensor includes linkage means, which is adapted for interconnecting the rotor assembly with a relatively displaceable portion of the host system. Finally, the galvanomagnetic sensing element operates to produce an output signal indicative of the relative angular position of said housing assembly and rotor assembly. This arrangement provides precise axial spacing between the galvanomagnetic sensing element and magnet, which can consistently produce a highly linear output signal throughout a large rotation range ($\leq 180°$).

According to an aspect of the invention, a reconfigurable multi-position indexing interface is provided between a rotor element and crank arm of the rotor assembly. This design feature allows the flexibility of placing the sensor's "zero position" at many angles. This arrangement permits flexibility in application of a common sensor in different attachment configurations with only minor changes on the final assembly components.

According to another aspect of the invention, when a permanent magnet is applied, its magnetic field is employed to self-attract the magnet to a ferrous rotor assembly component and firmly maintain its position on the rotor. Normally, ferromagnetic material is kept away from the magnet in order to avoid perturbance to the magnetic field. In the present invention the magnetic circuit, sensing device and magnet interaction, even with a ferromagnetic material in close proximity, are insensitive to such a perturbance of the magnetic field.

According to still another aspect of the invention, the magnet is optimized to increase flux in one of the faces of the magnet, where the sensitive element will be placed. This is accomplished by the addition of concentrating features to the magnet shape. Flux direction can be oriented as required, thereby providing increased sensing capability.

According to still another aspect of the invention, the rotor and stator assemblies are attached employing a simple and inexpensive groove-less retainer. This method of securely attaching the rotor to the stator on rotary sensors permits relative rotation between the stator and rotor. As the retainer is axially positioned using a simple press, its self-engaging tab features are driven into the plastic housing to prevent any axial withdrawal in the opposite direction. This retaining feature is symmetrical about the center of the rotor, enabling a smooth rotation between the stator and rotor.

According to still another aspect of the invention, a single fastener, such as a screw, is employed to maintain the rotor element and crank arm together. A mechanical locking feature is also employed to strengthen the attachment of the rotor element and crank arm. This provides a simple, low cost, robust interconnection.

According to another broad aspect of the invention, the housing assembly defines an electrical device enclosure including a base portion defining at least one potting region, an upstanding outer wall circumscribing the base portion and an upstanding barrier wall circumscribing the potting region. The barrier wall is spaced from the outer wall to define a buffer cavity there between. The base portion and the barrier wall cooperate to define a potting material receiving cavity. Weir means are provided to define a maximum fill level for fluid potting material within the potting cavity and to divert excessive fluid potting material into the buffer cavity. Finally, fastener means are provided within the potting cavity to secure an electrical device, such as the galvanomagnetic sensing element, within the potting cavity below the maximum fill level. This arrangement simplifies the potting phase of the manufacturing process.

According to still yet another aspect of the invention, the housing assembly includes a cavity defined by inwardly facing wall surfaces enclosing the galvanomagnetic sensing element. The housing further defines a system of upstanding structural features forming abutment surfaces operative to precisely orient and retain the galvanomagnetic sensing element within the cavity. During manufacturing, the pocket or abutment surfaces also help hold the galvanomagnetic sensing element in position as the associated printed circuit board (PCB) is placed for soldering of the through-hole sensor terminals and device leads.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

Figure 1:
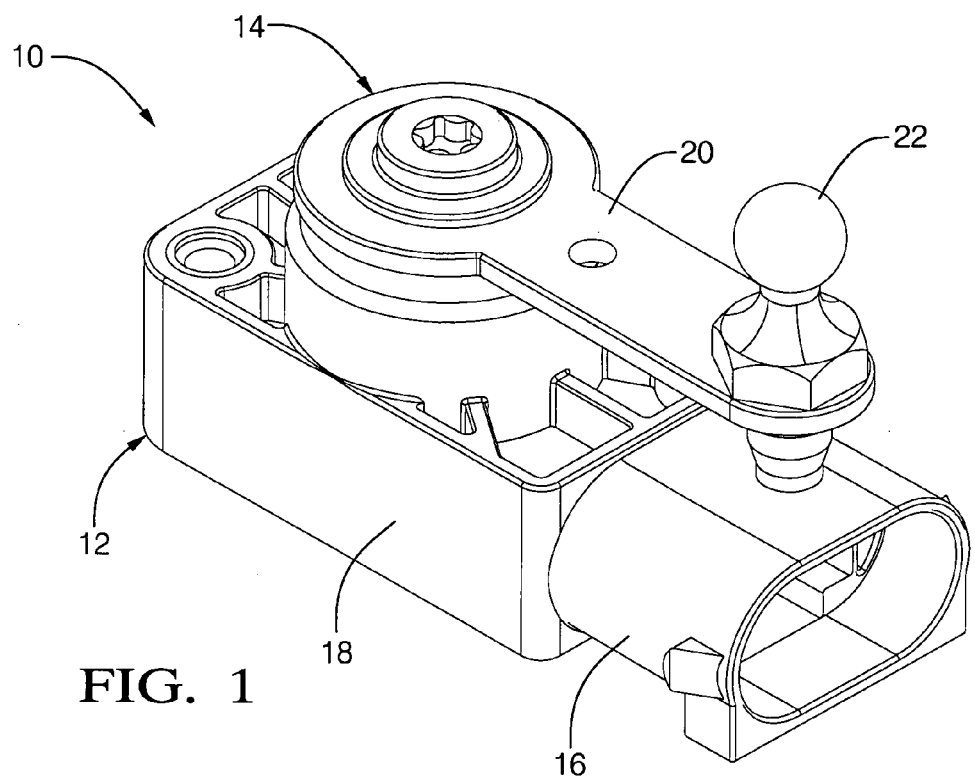
FIG. 1, is a perspective view of a rotary position sensor embodying the present invention.

Corresponding reference characters indicate corresponding parts throughout the several views. Although the drawings represent an embodiment of the invention, the drawings are not necessarily to scale and certain features may be exaggerated in order to better illustrate and explain the present invention. The exemplifications set out herein illustrate preferred and alternative embodiments of the invention and such exemplifications are not to be construed as limiting the scope of the invention in any manner.

DETAILED DESCRIPTION OF THE PREFERRED AND ALTERNATIVE EMBODIMENTS OF THE INVENTION

The present invention is intended for application in automotive vehicle systems and will be described in that context. It is to be understood, however, that the present invention could also be successfully applied in many other applications. Accordingly, the claims herein should not be deemed as limited to the specifics of the preferred application as described hereunder.

The preferred embodiment of the rotary position sensor described herein represents an extremely robust, low cost, compact, highly accurate design, which can be easily reconfigured for alternate applications (requiring large or small sensing ranges) without the need to invest time and expense for re-tooling significant components thereof. Furthermore, the component configuration and arrangement enables use of simplified manufacturing processes and somewhat relaxed tolerances, increasing turnover at lower cost without adversely impacting quality.

Referring to FIG. 1, a rotary position sensor 10 comprises a housing assembly 12 and a rotor assembly 14. Housing assembly 12 is adapted for fixation or mounting to a relatively fixed portion of a host system such as the body or frame of a motor vehicle (not illustrated). An electrical connector 16 extends from a housing 18 of housing assembly 12 and is adapted for electrically interfacing sensor 10 with suitable electrical power and control circuitry such as the electrical wiring system of the host system via a wiring harness (not illustrated).

The rotor assembly 14 of sensor 10 includes a crank arm 20, which is affixed at one end to the remainder of rotor assembly 12 for rotational displacement therewith. The other end of crank arm 20 carries a ball socket 22, which, in application, is interconnected with a relatively displaceable portion of the host system such as a suspension element of a motor vehicle (not illustrated) through appropriate linkage. An example of such an application is described in U.S. Pat. No. 6,566,864 to T. Brown et al., the specification of which is incorporated herein by reference.

As employed in the present application, the term "linkage means" is to be construed to include the crank arm 20 as well as any additional or equivalent structures which effect an interconnection of the rotor assembly to the host system.

Figure 2:
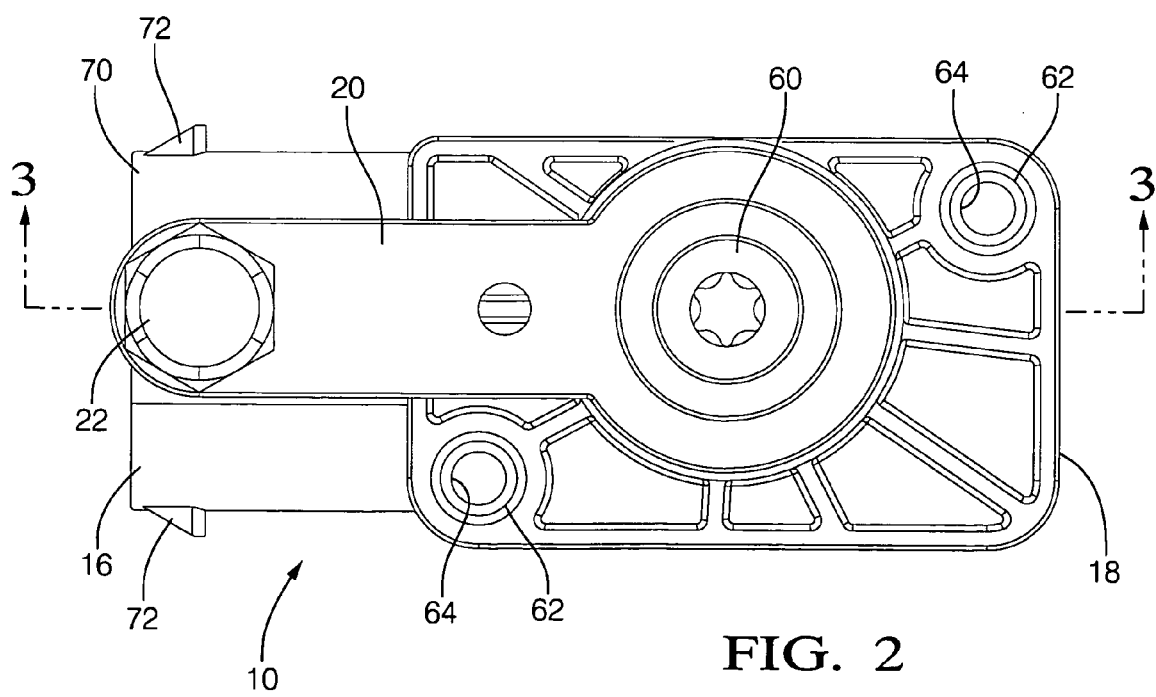
FIG. 2, is a top plan view, on an enlarged scale, of the rotary position sensor of FIG. 1.
Figure 3:
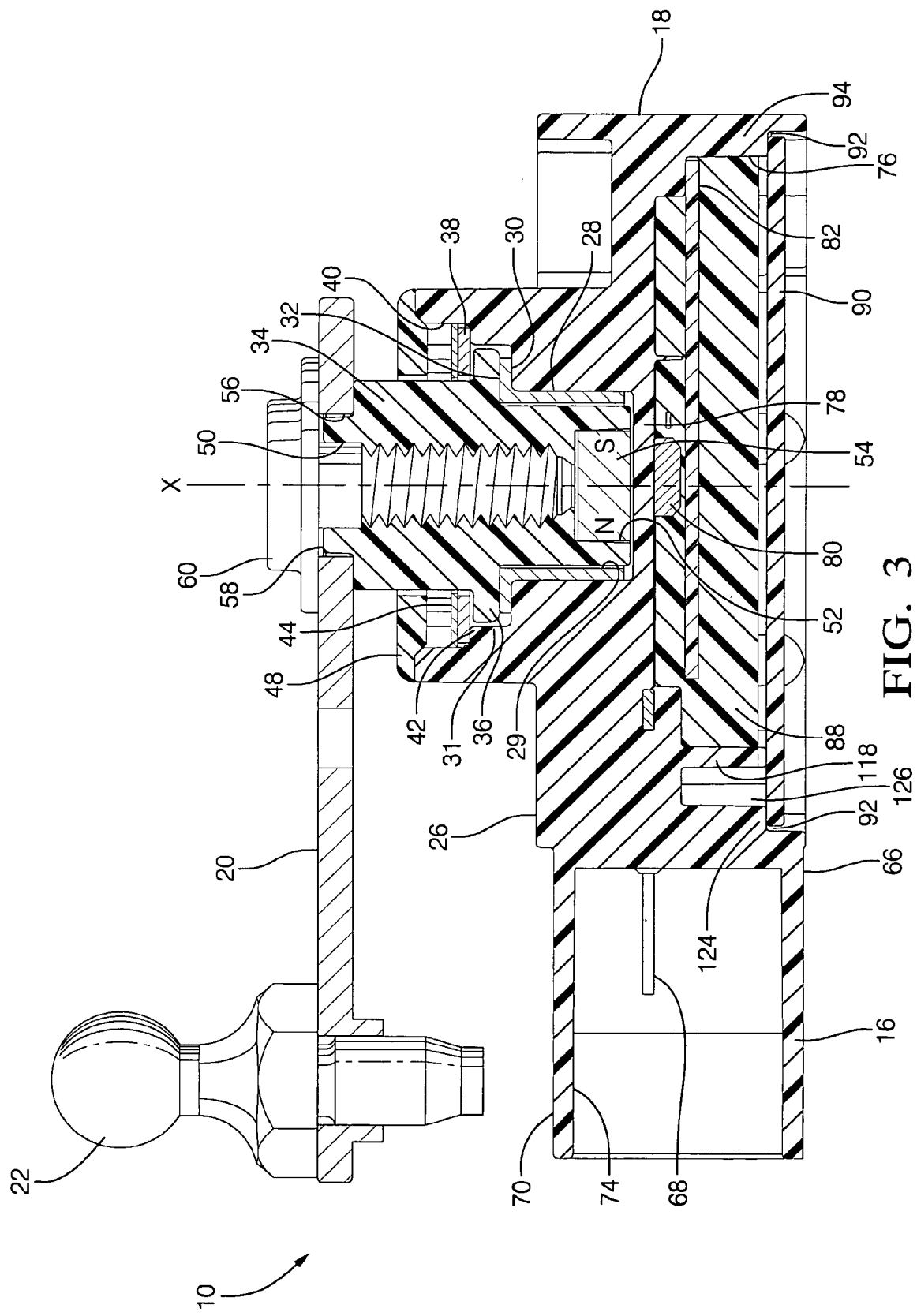
FIG. 3, is a cross-sectional view of the rotary position sensor taken on lines 3—3 from FIG. 2.

Referring to FIGS. 2 and 3, the internal detail of sensor 10 is illustrated. Housing 18 of housing assembly 12 is preferably formed as a single integrated piece, which is injection molded of thermoplastic, glass-filled nylon or other suitable non-ferrous material.

As best viewed in FIG. 3, a stepped blind bore 24 opens upwardly through the top surface 26 of housing 18 to receive the rotor assembly 14. Stepped bore 24 constitutes a first cavity within housing 18. A bushing 28 is press fit within the lowermost and smallest diameter portion 29 of bore 24. For low cost applications, bushing 28 is preferably molded of Nylon or other suitable plastic material, depending upon the intended application and operational environment of the sensor 10. The upper portion of bushing 28 integrally forms a radially outwardly extending flange 30 disposed within an axially intermediate portion 31 of stepped bore 24. The upper surface of flange 30 constitutes a thrust surface 32.

Rotor assembly 14 includes a generally cylindrical rotor element 34 dimensioned to nestingly slip-fit within bushing 28 and stepped bore 24 for rotation about axis X—X. Rotor element 34 defines a radially outwardly extending circumferential flange 36, the bottom surface of which abuts thrust surface 32 of bushing 28. Rotor element 34 is preferably formed by injection molding of thermoplastic, glass-filled nylon or other suitable non-ferrous material. A thrust washer 38 is positioned within stepped bore 24 and is limited from axial downward displacement by the transition between the upper, large diameter portion 40 and intermediate portion 31 of stepped bore 24. Intermediate portion 31 is formed of a plurality of circumferentially spaced, radially inwardly directed webs 42, which co-act to define the effective inner diameter of intermediate portion 31. The lower surface of thrust washer 38 defines an upper thrust surface acting against the upper surface of flange 36 of rotor element 34.

Figure 4:
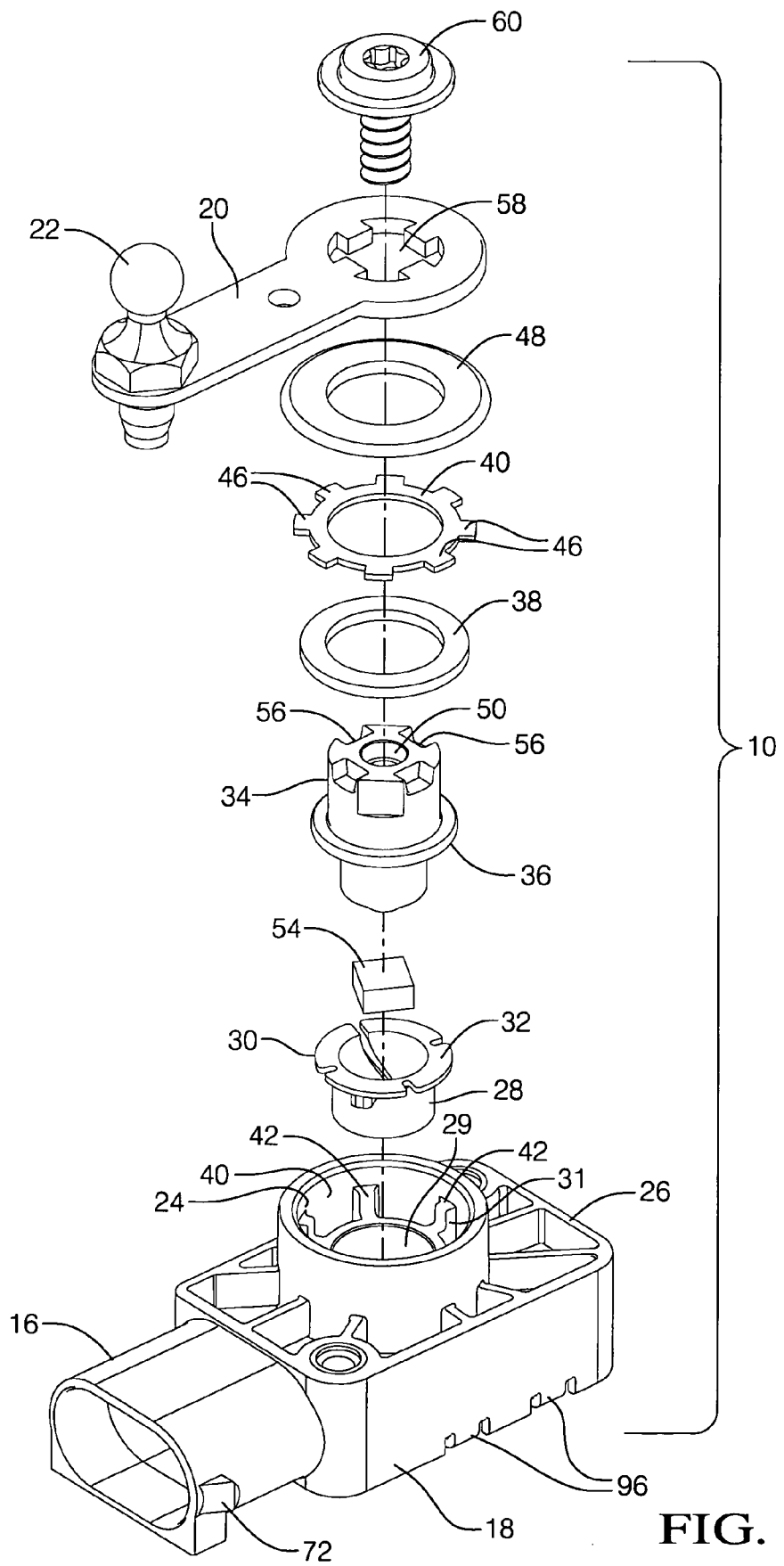
FIG. 4, is an exploded perspective view of the rotary position sensor of FIG. 1, on a slightly enlarged scale.

As best viewed in FIG. 4, a self-engaging, self-locking retainer 44 is pressed axially downwardly within the large diameter portion 40 of stepped bore 24 until it fixes the thrust washer 38 in its illustrated position. Retainer 44 is preferably formed of hardened steel or other suitable material and defines a plurality of sharp-edged circumferentially spaced, radially outwardly directed projections 46. Retainer 44 forms an interference fit within stepped bore 24. Upon installation, projections 26 act to "bite" into the material of housing 18 defining the large diameter portion 40 of stepped bore 24. Thus, once installed, retainer 44 cannot be easily removed and holds the rotor assembly 14 in its illustrated position wherein it is free to rotate about axis X—X, but is axially restrained directions by the depicted housing assembly.

In operation, the bushing 28 serves to absorb radial force vectors applied to the rotor assembly 14 and the bushing flange 30 and thrust washer 38 co-act to prevent relative axial displacement between the housing assembly 12 and rotor assembly 14 by absorbing axial force vectors applied to the rotor assembly 14.

An annular snap-fit protective closure member 48 provides a rotating seal to prevent entry of environmental debris and water within stepped bore 24.

Rotor element 34 of rotor assembly 12 has an axial through bore 50 formed therein. The lowermost end of through bore 50 is radially expanded to define a generally rectangular, axially downwardly opening pocket 52. A permanent magnet 54 is slip-fit within pocket 52 with its North and South magnetic poles radially spaced from one another. Permanent magnet 54 is part of and rotates with the rotor assembly 14.

The uppermost end of rotor element 34 extending through closure member 48 defines a plurality of radially outwardly opening faceted notches 56 which are circumferentially equally spaced about the outer perimeter thereof. One end of crank arm 20 defines an axially directed hole 58 there through which is complimentarily shaped and dimensioned to approximate a mirror image of the faceted notches 56 of the rotor element 34. Faceted notches 56 and shaped hole 58 interact for nesting engagement to index the crank arm 20 with the rotor element 34 for rotation as a single assembly.

In the preferred embodiment of the invention, four sets of faceted notches 56 and corresponding shaped features of hole 58 are employed. Thus, there are four possible fixation orientations between the crank arm 20 and rotor element 34. Referring to FIGS. 2 and 4, the crank arm is illustrated in the nominal "zero position" or 9:00 position as viewed from above. If desired, the preferred sensor 10 could be reconfigured in one of four discrete orientations between the crank arm 20 and rotor element 34 by repositioning the crank arm to the 12:00, 3:00 or 6:00 position.

Many applications exist that require the use of the same sensor with different attachment configurations. Maintaining flexibility of the "zero position" on the sensor 10 is a desired characteristic to reduce the number of part numbers and to simplify the production process and logistics. Prior and current designs that do not employ this flexibility suffer in cost and part number inventory and logistics issues. This flexibility enables the development of a "base sensor" that fits all configurations with only minor changes on the final assembly of components.

It is contemplated that more or fewer indexing fixation orientations could be provided. Alternatively, the indexing features can be made so small as to effectively permit near infinite adjustment capability.

Once the relative angular orientation between the crank arm 20 and rotor element are selected, a single, self-taping pan head set screw 60 fixes the crank arm to the remainder of the rotor assembly 14.

The attachment of the sensor crank arm to the sensor rotor or housing assembly requires a durable design since the majority of the forces exerted during the rotary motion of the sensor will be at those components. The secure attachment of these two components is typically accomplished with either expensive processes or through the use of several fastening components such as screws. The innovative approach of the present invention reduces the processes and component costs by utilizing only one fastener, such as a screw, along with a mechanical locking feature designed into the rotor assembly between the crank arm and rotor element.

Once assembled, the threaded shaft portion of screw 60 extends radially downwardly within through bore 50, terminating adjacent permanent magnet 54. By selecting a screw 60 formed of ferrous material, the screw 60 and magnet 54 self-attract one another. This feature advantageously maintains the magnet firmly within pocket 52 without the need for force fitting, insert molding adhesively binding, etc, the magnet 54 in its design position. Such precise positioning of the permanent magnet 54 enhances overall operational accuracy of the sensor 10.

Several sensing technologies exist for non-contact position sensors. Those utilizing Hall-effect and magneto-resistive (MR) sensing devices can be generally categorized as magnetic technology since they require the presence of a magnetic field typically produced by one or more permanent magnet(s). For rotary position sensors, the permanent magnet(s) is usually attached to the rotating body of the sensor (rotor) while the sensing device (Hall or MR) is attached to the stationary body (stator).

Precise and permanent location of the magnet(s) relative to the sensing device is critical for precise sensing of the rotational position. As the rotor moves, the magnet(s) must move accordingly. Today's sensors utilize two methods for ensuring the magnet(s) remain in position. Insert-molding the magnets within the rotor plastic during the molding process and press fitting the magnet(s) into cavities within the rotor after the molding process. Both of these methods significantly increase the complexity of the rotor design and the tool(s) for the manufacturing process(es).

The present invention provides a design, which reduces the complexity of the rotor design and tool(s) needed for the manufacturing process.

Referring to FIGS. 2 and 4, the housing 18 of housing assembly 12 defines two diametrically opposed steel mounting bushings 62, which are insert molded within housing 18 to define axially extending through bores 64 extending between the top surface 26 and bottom surface 66 of housing 18. Suitable fastener means such as threaded bolts (not illustrated) are employed in application to affix sensor 10 to the host system.

Referring to FIGS. 2 and 3, electrical connector 16 includes one or more electrically conductive spade-type terminals 68 insert molded within housing 18 protected by an outwardly extending insulating connector housing 70. Connector housing 70 defines a second cavity 74 within housing 18, is integrally formed therewith 18 and defines retention features 72 for interconnecting sensor 10 with a mating plug connector from a host system wiring harness (not illustrated).

Figure 5:
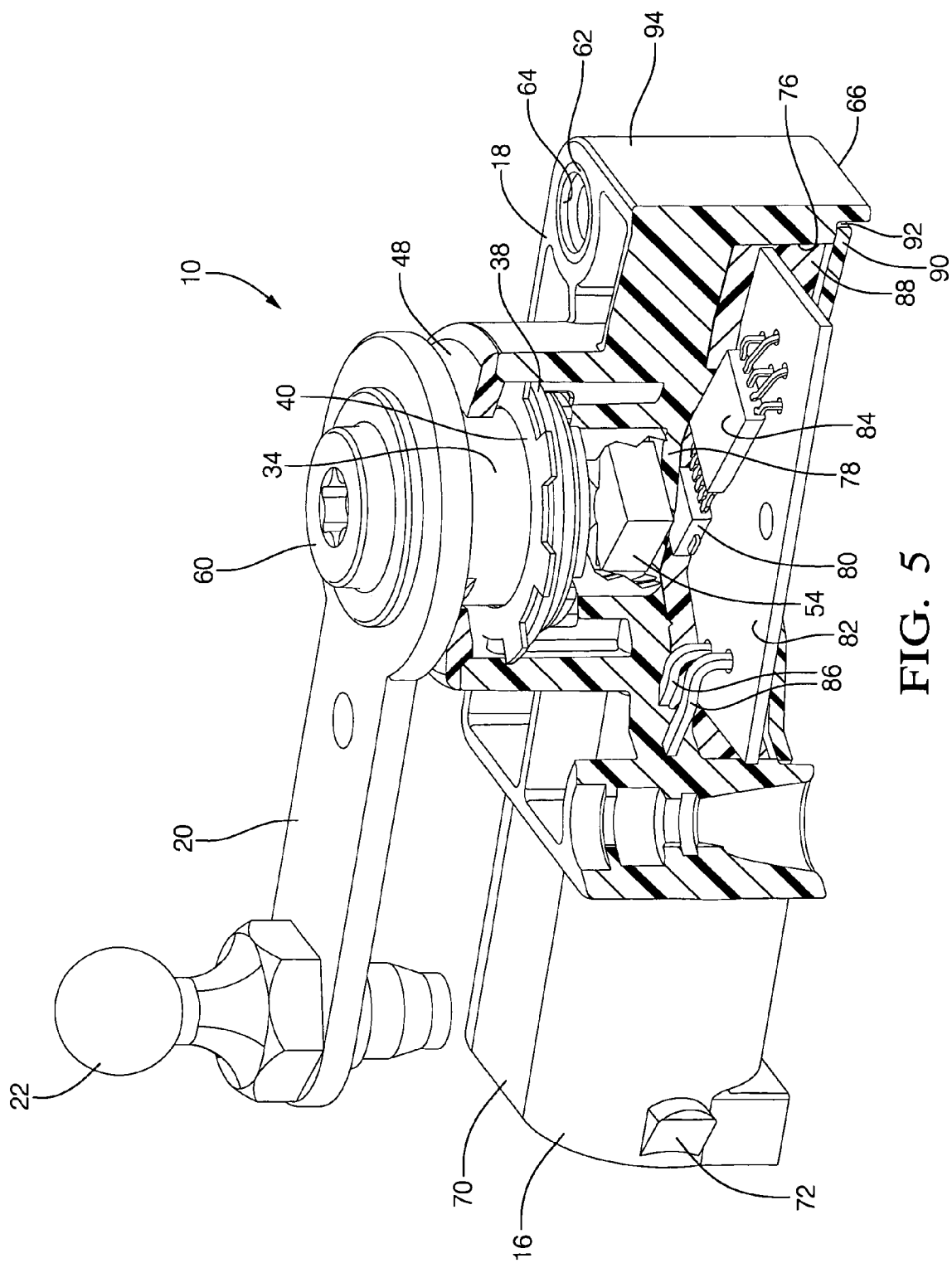
FIG. 5, is a broken sectional view of the rotary position sensor of FIG. 1, on a still enlarged scale.
Figure 7:
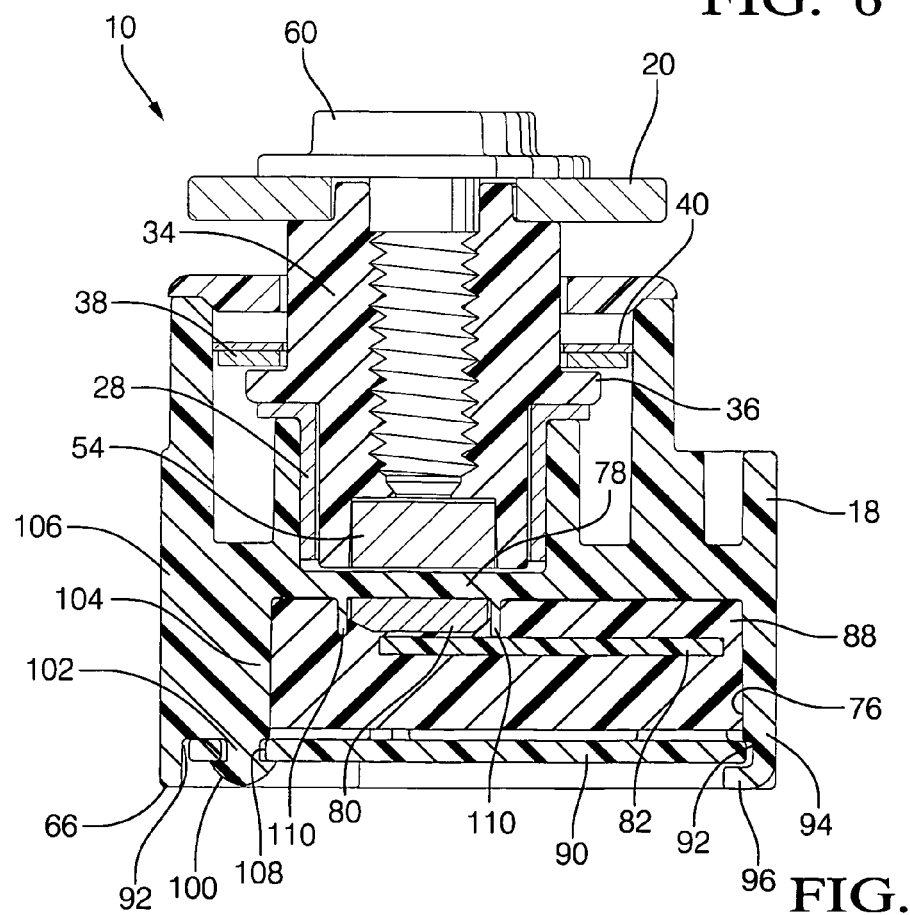
FIG. 7, is a cross-sectional view of the rotary position sensor taken on lines 7—7 from FIG. 6.

As best viewed in FIGS. 3, 5 and 7, a third cavity 76 is formed within housing 18 which opens downwardly through the bottom surface 66. The first cavity (stepped bore 24) and the third cavity 76 are juxtaposition and dimensioned to define a thin web 78 of material there between aligned with axis X—X. Cavity 76 serves to house a galvanomagnetic sensing element 80 and an associated printed circuit (PC) board 82. In the application contemplated by the applicant, an MR Programmable Angle Sensor—Model KMA200 produced by Philips Semiconductors, was preferred, although many other similar devices are commercially available. The galvanomagnetic sensing element 80 is positioned within cavity 76 in precise axial alignment with permanent magnet 54 with web 78 imposed there between. A programmable control integrated circuit 84 is also mounted to the PC board. Conductors 86 interconnect the PC board circuitry with terminals 68. As will be described herein below, means are provided for positioning and securing the PC board 82 and its associated components 80 & 84 within cavity 76. Potting material 88 substantially fills cavity 76, fully immersing PC board 82.

A significant advantage of the present invention is that the rotor assembly 14 has a full 360 degree freedom of rotation. Thus, it can be employed for applications involving continuous uni-directional movement or rotation of a component to be monitored on a host system. Most existing designs have a limited sensing range, i.e. of less than 360 degrees, thereby limiting their application to devices with limited, reciprocating type motions. Furthermore, the programmable control integrated circuit 84 provides great flexibility in applying the present invention by, if necessary, simply programming the sensor controller to read or monitor only a defined segment(s) or sector(s) of its potential 360 degree range of movement. Thus, only simple programming changes are required to adapt the sensor 10 to a new application. By contrast, prior art devices frequently require retooling of major sensor components, which can add piece cost, scheduling delays as well as part number proliferation.

Figure 6:
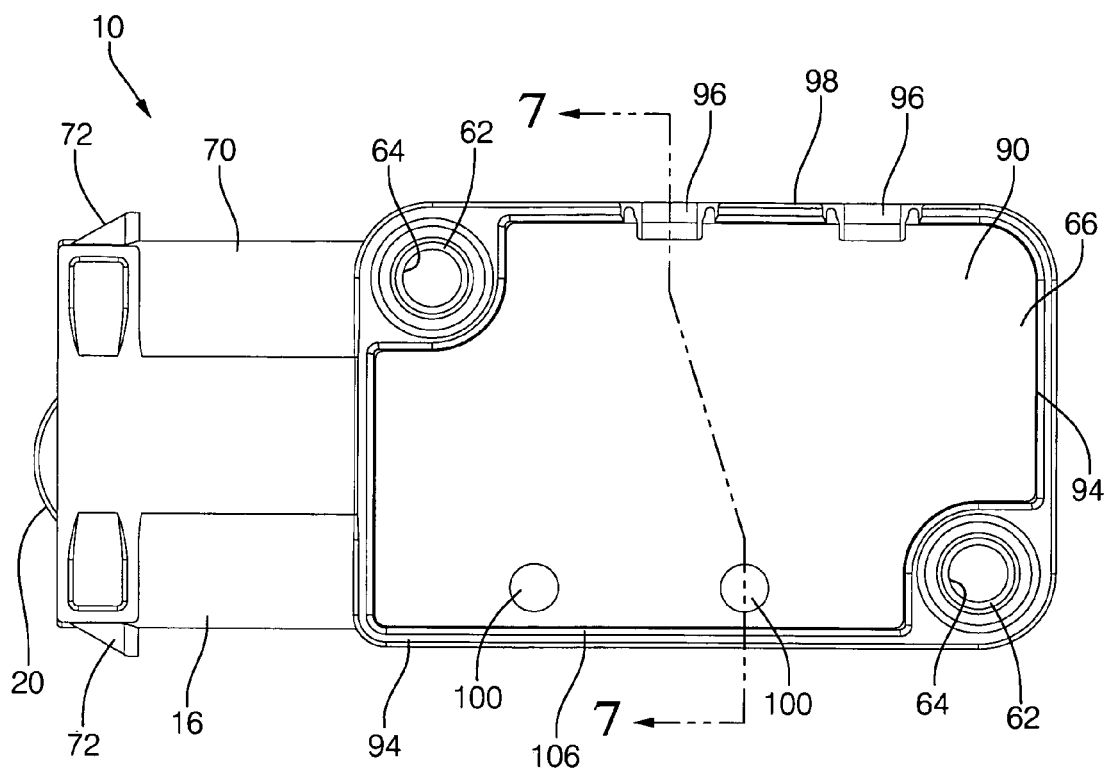
FIG. 6, is a bottom plan view, on an enlarged scale, of the rotary position sensor of FIG. 1.

Referring to FIGS. 6 and 7, cavity 76 is closed by a bottom plate 90 to further protect the contents of cavity 76. To reduce cost and manufacturing complexity, cover plate 90 is affixed to housing 18 employing a fastenerless design. Bottom plate 90 is stamped of mild steel, plastic, or other suitable inexpensive material.

Figure 8:
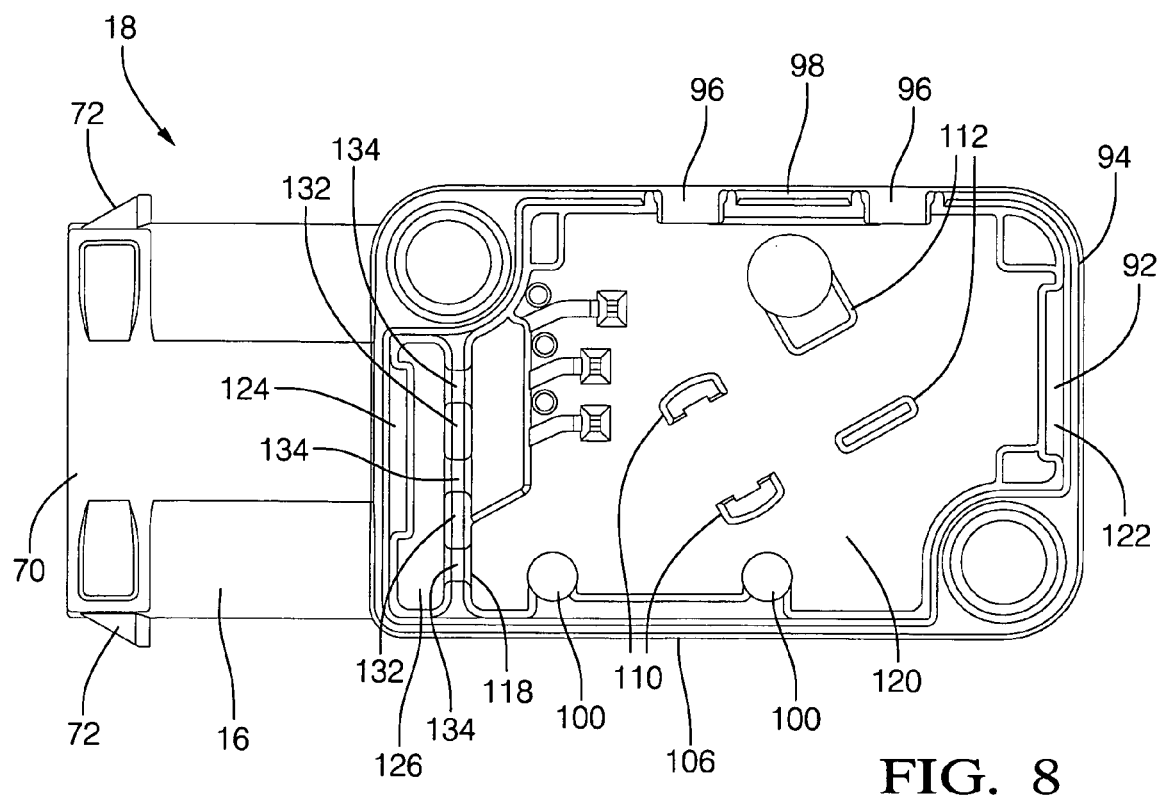
FIG. 8, is a bottom plan view of the rotary position sensor similar to FIG. 6, but with the rotor assembly and all internal components of the housing assembly removed.
Figure 9:
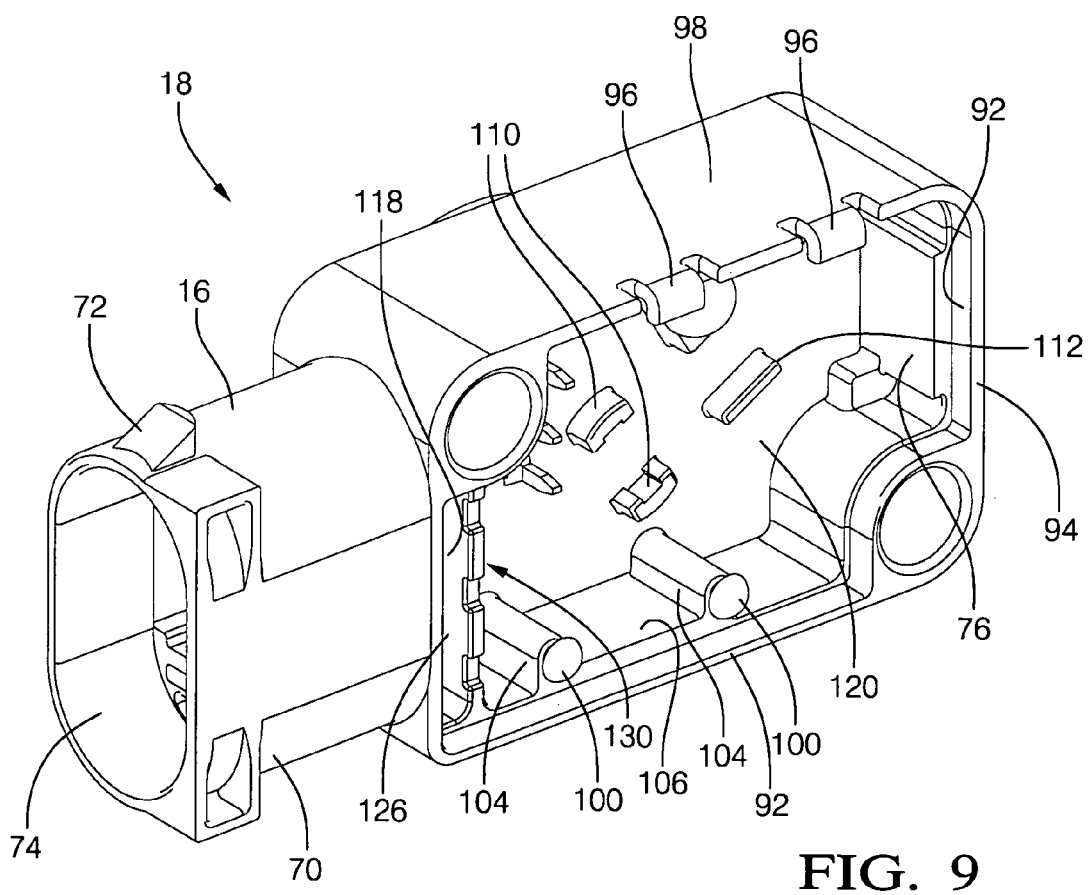
FIG. 9, is a perspective view of the housing structure from FIG. 8.

The bottom plate 90 is nestingly disposed within a circumferential notch 92 formed in the lowermost portion of the outer wall 94 of housing 18 adjacent bottom surface 66. As best seen in FIGS. 8 & 9, which depict the housing 18 alone, bottom plate retention means are provided in the form of two circumferentially spaced edge engaging hooks 96 integrally formed along one side wall portion 98 of outer wall 94. Two button retainers 100 are integrally formed with intermediate neck regions 102 and bosses 104 formed along an opposed sidewall portion 106.

Referring to FIG. 7, bottom plate 90 has a pair of apertures 108, which, upon assembly, register with button retainers 100. The inside diameter of apertures 108 are slightly less than the maximum outer diameter of button retainers 100. Final assembly is accomplished by positioning an edge of bottom plate between notch 92 and hooks 96 and pressing the opposed edge of the bottom plate 90 until the button retainers 100 extend entirely through their corresponding bottom plate apertures 108. The natural resilience of the material forming housing 18 permits momentary localized compression of the button retainers 100 during the assembly process. Once in place, the button retainers are heat-staked to form a mushroom head and permanently entrap bottom plate 90. The above described fastener less retention reduces part count and manufacturing cost, as well as improves overall quality.

Referring to FIGS. 7, 8 and 9, a first pair of retention bosses 110 are integrally formed within web 78, and extend downwardly into cavity 76. Retention bosses 110 are spaced and configured to straddle and entrap galvanomagnetic sensing element 80 there between in precise axial alignment with permanent magnet 54. A second pair of retention bosses 112 are also integrally formed within web 78 and extend into cavity 76. Retention bosses 112 are spaced and configured to straddle and entrap related control circuit 84 there between. Retention bosses 110 and 112 define lower abutment surfaces 116 and 118, respectively, positioned approximately midway in the depth dimension within cavity 76 to precisely position the printed circuit board 82 within cavity 76.

This feature ensures that the printed circuit board is suspended in a spaced relationship with the surrounding circumferential outer wall 94 of housing 18, and that both the printed circuit board 82 as well as its associated electrical components (galvanomagnetic sensing element 80, control circuit 84, conductors 86, inter alia.) are fully immersed within potting material 88.

The manner of achieving and maintaining the position of the sensing device within the sensor is critical for sensor accuracy and is the main driver for manufacturing costs. Previous sensor designs often over-mold the sensing devices, increasing manufacturing costs, or leave the sensing devices suspended upright over the printed circuit board and on its electrical leads, increasing the risk of misplacement or failure due to vibration. The present invention provides a pocket on the stator or housing assembly for securely and accurately positioning the sensing device within the stator.

Referring to FIGS. 3, 8 and 9, a barrier wall 118 integrally formed within housing 18 extends laterally between sidewall portions 98 and 106 of outer wall 94 to bisect the third cavity 76 into a potting region and a buffer region. Thus, the potting region is a compartment or portion 120 of cavity 76, which is circumscribed by sidewall portions 98 and 106, end wall portion 122 and barrier wall 118. The buffer region is a compartment or portion 126 of cavity 76, which is circumscribed by sidewall portions 98 and 106, end wall portion 124 and barrier wall 118.

The potting compartment or portion 120 of cavity 76 houses the printed circuit board 82, as well as galvanomagnetic sensing element 80 and other relater electrical components. By design, portion 120 of cavity 76 is filled with potting material in a fluid state until the potting material reaches a maximum fill level. When portion 120 is filled to the maximum fill level, all electrical components within portion 120 are fully immersed within potting material.

The lowermost lateral surface 128 of barrier wall 118 defines a weir, designated at 130, which directs the overflow of any excessive fluid potion material past barrier wall 118 and into the buffer portion 126 of cavity 76. Weir 130 comprises a series of generally tooth-shaped barriers 132 and recesses 134, the function of which is described in greater detail herein below in reference to FIGS. 10 and 11.

Barriers 132 traverse the entire depth of cavity 76 and, upon final assembly, abut the inside surface of bottom plate 90 to lend structural support thereto. Recesses 134 define passageways for diversion of (any) excess fluid potting material into the buffer portion of cavity 76.

It should be clear to the reader that during the liquid potting material filling phase of the manufacturing process, housing 18 is preferably inverted from the orientation depicted in FIGS. 3, 5 and 7. To further clarify this point, a simplified alternative embodiment is described herein below.

Figure 11:
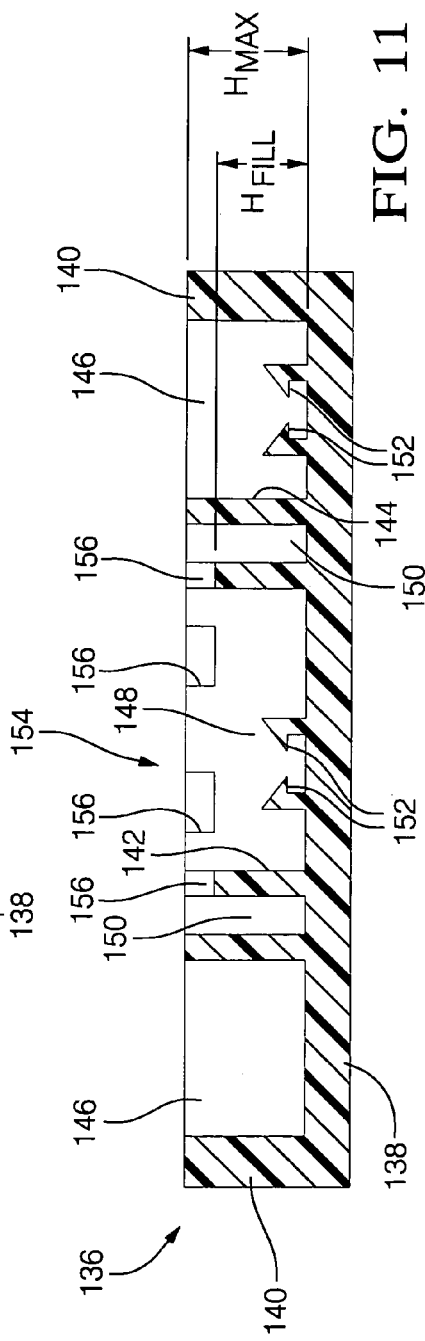
FIG. 11, is a cross-sectional view of the alternative embodiment housing structure taken on lines 11—11 from FIG. 10.
Figure 10:
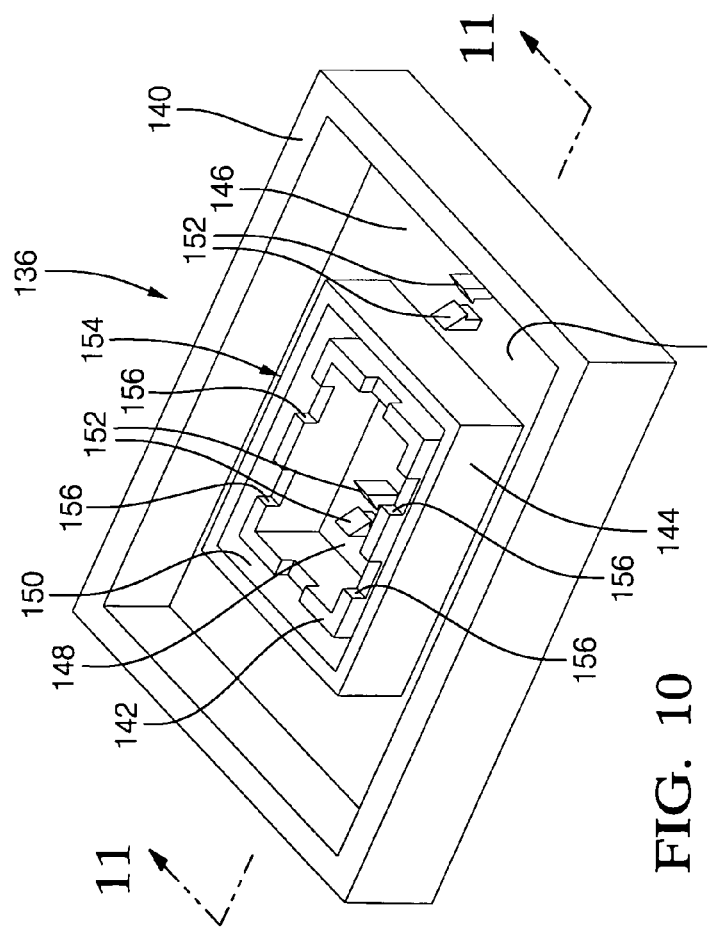
FIG. 10, is a perspective view of an alternative embodiment of a housing structure for a rotary position sensor.

Referring to FIGS. 10 and 11, a housing 136 intended for application with an electrical device such as a rotary position sensor, is illustrated. Housing 136 is depicted as a portion of a housing assembly for the electrical device with ancillary features removed for the sake of clarity.

Housing 136 is disposed in a generally upwardly facing orientation corresponding with the preferred position for application of liquid potting material during the manufacturing process. Housing 136 defines a generally rectangular planar base portion 138. An upwardly directed housing wall 140 circumscribes the outer peripheral edge of the base portion 138. A concentric interior barrier wall 142 is centrally located within housing wall 140. A concentric outer wall 144 is disposed intermediate housing wall 140 and barrier wall 142. Housing wall 140, barrier wall 142 and outer wall 144 are all integrally formed with base portion 138 and extend upwardly there from to a nominal height designated "H-max". Walls 140, 142 and 144, along with base portion 138 define three discrete cavities, an outer cavity 146, a potting cavity 148 and a buffer cavity 150.

In application, outer cavity 146 will contain electrical and mechanical components of the electrical device 136 which are not to be potted. Components such as printed circuit boards and associated electrical and electronic components intended to be immersed in potting material are located within potting cavity 148. Component affixation devices 152, preferably integrally formed with base portion 138, are provided within outer cavity 146 and potting cavity 148.

The uppermost edge portion of barrier wall 142 is designated as a weir, generally at 154. Weir 154 is defined by a succession of circumferentially spaced recesses 156 disposed circumferentially thereabout. Each recess 156 functions to effectively lower the vertical height of barrier wall 142 from "H-max" to "H-fill", where "H-max" is the maximum total height of potting cavity 148 and "H-fill" is the design potting material fill level.

During the manufacturing process, fluid potting material is poured into potting cavity 148. When the level of the potting material reaches the "H-fill" level, its flow is interrupted. Any additional or residual flow of excess potting material into potting cavity 148 will momentarily raise its level above the "H-fill" level, wherein the excess potting material will be diverted by the weir 154 through recesses 156 into the buffer cavity 150. Once the overflow into the buffer cavity 150 lowers the level of the potting material within the potting cavity 148 to the "H-fill" level, the overflow will cease and an equilibrium condition is established. At this point, the potting material is allowed to harden and the final assembly of the electrical component is completed.

Potting (silicon/epoxy) application is a very common process used in manufacturing of diverse types of equipment and components. In certain conditions, controlling filling volume is a critical factor and requires extremely precise and accurate dispensing equipment. The capability of controlling filling parameters of the dispensing system is normally related to the cost of the equipment. The more accurate and precise the operating specifications for the equipment, the more expensive the equipment becomes.

The present invention reduces manufacturing expense by creating a buffer volume, which will contain any overflow of potting material dispensed. This will improve filling volume control without using extremely expensive dispensing equipment.

Figure 12:
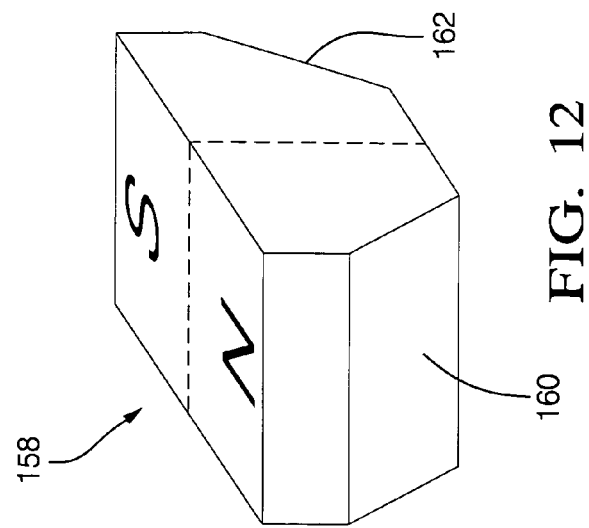
FIG. 12, is a perspective view of an alternative configuration permanent magnet employing flux concentrators for application with an alternative embodiment of a rotary position sensor.

Referring to FIG. 12, a permanent magnet 158 differs from the permanent magnet illustrated in FIG. 3 inasmuch as it is optimized to increase flux in one of the faces of the magnet by the inclusion of downwardly angled pole fillets 160 and 162. In the configuration depicted, the magnetic sensitive element would be disposed below permanent magnet 158. It is contemplated that simulation models can be employed to optimize the magnet configuration and/or the application of flux concentrators for a given application. By adding flux-concentrating features to the magnet, flux concentration can be oriented as desired to provide improved sensing capability.

In magnetic applications it is commonly desired to direct the magnetic flow in a certain direction or face of the magnet. A common method is through the use of concentrators, which are ferromagnetic material shaped and placed in the required position and orientation. Flux concentrators are extra components on the design of any part and would increase the manufacturing complexity of the part. In some cases, this will incur additional costs. The present invention, instead, provides a permanent magnet, which has been, itself, shaped to concentrate flux in the desired direction to eliminate the use of separate concentrators or the requirement of a larger size magnet. The alternative embodiment illustrated in FIG. 12 is easily implemented and does not require expensive processes in magnet manufacturing.

Upstanding integral reinforcement ribs and voids depicted in the embodiment of the invention of FIGS. 1–9 are employed extensively in the design of housing 18 of sensor 10 to minimize weight, cost, molding and manufacturing complexity, and raw materials while maintaining a robust, efficient design.

It is to be understood that the invention has been described with reference to specific embodiments and variations to provide the features and advantages previously described and that the embodiments are susceptible of modification as will be apparent to those skilled in the art. For example, although use of a permanent magnet is preferred in applicant's intended application, electromagnets or other similar devices could be employed as well. Additionally, the operation of the stator and rotor can be reversed. That is, the rotor assembly could be affixed to a relatively stationary object and the housing assembly could be carried for relative rotation with a moving object. Also, the magnet could be incorporated within the housing assembly and the magnetoresistive element could be incorporated within the rotor assembly.

Furthermore, it is contemplated that many alternative, common inexpensive materials can be employed to construct the permanent magnets and related components. Accordingly, the forgoing is not to be construed in a limiting sense.

The invention has been described in an illustrative manner, and it is to be understood that the terminology, which has been used is intended to be in the nature of words of description rather that of limitation. For example, terms providing directional orientation such as above, below leftwardly, rightwardly, inwardly and outwardly, to name a few, are only intended as aids in understanding positional relationships within a particular drawing figure or reference. The sensor housing would clearly be inverted during the potting process wherein up is down and vice versa.

Obviously, many modifications and variations of the present invention are possible in light of the above teachings. It is, therefore, to be understood that within the scope of the appended claims, wherein reference numerals are merely for illustrative purposes and convenience and are not to be in any way limiting, the invention, which is defined by the following claims as interpreted according to the principles of patent law, including the Doctrine of Equivalents, may be practiced otherwise that as specifically described.

The invention claimed is:

1. An electrical device enclosure comprising:
    a base portion defining at least one potting region;
    an upstanding outer wall circumscribing said base portion;
    an upstanding barrier wall circumscribing said potting region and spaced from said outer wall to define a buffer cavity therebetween, said base portion and barrier wall cooperating to define a potting material receiving cavity;
    weir means operative to define a maximum fill level for fluid potting material within said potting cavity and to divert excessive fluid potting material into said buffer cavity; and
    means for securing an electrical device within said potting cavity below said maximum fill level.

2. The electrical device enclosure of claim 1, further comprising a closure member operative to fully enclose said potting cavity and said buffer cavity.

3. The electrical device enclosure of claim 2, wherein said barrier wall defines an abutment surface operative to position said closure member in a fixed spacial relationship from said base portion.

4. The electrical device enclosure of claim 2, wherein said outer wall and said closure member comprise complimentary self-engaging fastenerless attachment features operative to affix said closure member to said outer wall.

5. The electrical device enclosure of claim 1, wherein said weir means comprises at least one passageway formed in said barrier wall interconnecting said potting material receiving cavity and said buffer cavity.

6. The electrical device enclosure of claim 1, wherein said outer wall and barrier wall are integrally formed with said base portion.

7. The electrical device enclosure of claim 1, wherein said means for securing an electrical device within the potting cavity comprise upstanding abutment surfaces integrally formed in said base portion to orient and retain said electrical device.

8. The electrical device enclosure of claim 1, wherein said outer wall and barrier wall are at least partially circumferentially coextensive.

9. The electrical device enclosure of claim 1, further comprising a non-potted cavity disposed adjacent said potting material receiving cavity.

10. The electrical device enclosure of claim 9, further comprising means for securing a second electrical device disposed within said non-potted cavity.

* * * * *